DAVID ARONSON
INVENTOR.
BY Daniel H. Bobis
Atty

DAVID ARONSON
INVENTOR.
BY Daniel H. Bobis
Atty

ABSORPTION REFRIGERATION SYSTEM

Filed Dec. 15, 1967 11 Sheets-Sheet 3

DAVID ARONSON
INVENTOR.
BY Daniel H. Bobis
Atty

DAVID ARONSON
INVENTOR.
BY Daniel H. Bobis
Atty

Nov. 18, 1969 D. ARONSON 3,478,530

ABSORPTION REFRIGERATION SYSTEM

Filed Dec. 15, 1967 11 Sheets-Sheet 5

DAVID ARONSON
INVENTOR.

BY Daniel H. Bobis
Atty

DAVID ARONSON
INVENTOR.

BY Daniel H. Bobis
Atty

DAVID ARONSON
INVENTOR.

BY Daniel H. Bobis
Atty

Nov. 18, 1969 D. ARONSON 3,478,530

ABSORPTION REFRIGERATION SYSTEM

Filed Dec. 15, 1967 11 Sheets-Sheet 8

DAVID ARONSON
INVENTOR.

BY Daniel H. Bobis
Atty

DAVID ARONSON
INVENTOR.
BY Daniel H. Bobis
Atty

DAVID ARONSON
INVENTOR.
BY Daniel H. Bobis
Atty

Nov. 18, 1969 D. ARONSON 3,478,530

ABSORPTION REFRIGERATION SYSTEM

Filed Dec. 15, 1967 11 Sheets-Sheet 11

DAVID ARONSON
INVENTOR
BY Daniel H. Bobis
Atty

United States Patent Office 3,478,530
Patented Nov. 18, 1969

3,478,530
ABSORPTION REFRIGERATION SYSTEM

David Aronson, Upper Montclair, N.J., assignor to Worthington Corporation, Harrison, N.J., a corporation of Delaware Continuation-in-part of application Ser. No. 559,889, June 23, 1966. This application Dec. 15, 1967, Ser. No. 706,737
Int. Cl. F25b *15/06*; C09k *3/06*
U.S. Cl. 62—112 8 Claims

ABSTRACT OF THE DISCLOSURE

Absorption refrigeration processes and systems employing an aqueous solution of mixed lithium and zinc halides therein; aqueous solutions of mixed lithium and zinc halides useful as coolants and in absorption refrigeration.

RELATED APPLICATIONS

This application is a continuation-in-part of application Ser. No. 559,889 filed June 23, 1966, (now abandoned), which in turn is a continuation-in-part of copending U.S. patent application Ser. No. 550,190 filed May 16, 1966 (now abandoned).

BACKGROUND OF THE INVENTION

Field of the invention

The present invention relates to absorption refrigeration systems and processes, and to compositions useful in said absorption refrigeration systems and processes and as liquid coolants. More specifically, the present invention relates to improved absorption refrigeration systems and processes employing water as a refrigerant and an aqueous solution of the halides of at least two different metals as an absorbent.

Description of the prior art

FIG. 1 of the accompanying drawings is a schematic diagram of a typical absorption refrigeration apparatus comprising absorber 10, evaporator 11, condenser 12, and concentrator 13 in which a refrigeration composition is circulated. The absorption refrigeration composition is heated in concentrator 13, suitably with steam 24, to drive off vapors of a relatively volatile component thereof, known as the refrigerant. The refrigerant vapors driven off in concentrator 13 pass to condenser 12 where they are condensed and where the heat of condensation is rejected to a suitable heat sink, such as cooling water 14. Condensed refrigerant 15 is then passed by pump 16 to evaporator 11 where the refrigerant is again vaporized at low pressures. The vaporization absorbs heat from circulating fluids 17, such as brine, which fluid can then be used outside the apparatus for refrigeration. The vapor pressure of the refrigerant in the evaporator determines the temperature produced by vaporization of the refrigerant, thus affecting the degree of cooling produced by the refrigeration apparatus.

Refrigerant vapors from evaporator 11 are absorbed in absorber 10 charged with absorption refrigeration composition (absorbent) 18 cycled from concentrator 13. After dilution with refrigerant vapor in absorber 10, first portion 19 of diluted absorbent is suitably returned to concentrator 13, where the volatile refrigerant is again driven off. Second portion 20 of the diluted absorbent may be returned directly to absorber 10 by pump 22.

Heat generated in absorber 10 by absorption of refrigerant vapors is rejected to heat sink 23, suitably cooling water and conveniently the same as sink 14. Typically, heat exchanger 21 between absorber 10 and concentrator

13 exchanges heat between hot concentrated absorbent 18′ passing from concentrator 13 to absorber 10 and relatively cooler refrigerant-diluted composition 19 being returned to concentrator 13.

Because evaporator 11 and absorber 10 in such refrig eration apparatus are in vapor phase communication, the partial pressure of refrigerant vapor in these two zones is the same and is determined by the partial pressure of refrigerant vapor over the concentrated absorbent solution in absorber 10. The lower the partial vapor pressure of refrigerant over the absorbent solution, the lower will be the temperature at which condensed refrigerant boils in evaporator 11, i.e. the lower the temperature to which fluid 17 is cooled.

Numerous refrigerant-absorber combinations have been proposed in the art. Those of principal interest employ water as the volatile refrigerant, in preference to toxic or inflammable substances such as ammonia or volatile organic fluids. The most common aqueous refrigerant composition utilizes aqueous lithium bromide solutions as the absorbent although numerous other salts and salt combinations have been proposed in the art, cf. U.S. Patents 2,986,525; 3,004,919; and 3,296,814, for example.

SUMMARY OF THE INVENTION

According to the present invention, absorption refrigeration systems and processes are described employing novel absorption refrigeration compositions, also useful as coolants, comprising an aqueous solution of lithium chloride or lithium bromide in combination with zinc chloride or zinc bromide, optionally with calcium chloride or bromide being additionally present. Specifically, the compositions of the present invention suitably combine lithium chloride and/or bromide with zinc chloride and/or bromide in a molar ratio from about 11:1 to about 1:2. In certain embodiments of the invention, calcium chloride and/or bromide may also be present in amounts such that the molar ratio of lithium halide to zinc halide in the ternary system is between about 5:1 and 1:2 and the molar ratio of combined lithium and zinc halide to calcium halide is between about 10:1 and 2:1. A preferred composition combines lithium, zinc, and calcium chlorides and/or bromides in a mol ratio of 1.2:1:0.3. These solutions present no unusual health hazards and are relatively inexpensive. (The use of the fluorides or iodides of these metals involves problems of solubility, stability, and cost which make these halides of lesser significance than the chlorides and bromides.)

Concentrated solutions of these salts, when employed as absorbents in absorption refrigeration apparatus utilizing water as the refrigrant, give an unusual degree of cooling in the evaporator because of the low vapor pressure of water vapor over the solutions in the absorber and permit the generation of temperatures below 32° F. Also, because of the high degree of solubility in water of mixed halide salts of the type described, absorption refrigeration solutions comprising these salts may be highly concentrated in the concentrator of absorption refrigeration apparatus by heating to temperatures higher than those possible in such apparatus employing conventional absorption refrigeration compositions. This has consequences of great advantage.

First, high pressure steam, e.g. steam at the 125 p.s.i.g. pressure conventional for steam generation and distribution, or at still greater pressures, may be used directly to heat the concentrators of absorption refrigeration apparatus employing the absorption refrigeration compositions of the invention. In the prior art, concentrators heated by steam at pressures lower than 125 p.s.i.g. (e.g. 12 p.s.i.g.) must be employed to prevent over-concentration of the absorption refrigerating composition by excessive heating and removal of refrigerant therefrom. Overconcentration results in the precipitation of solids which can cause undesirable plugging of the apparatus.

More important, because of the extremely low vapor pressure of water over concentrated absorbent solutions of the mixed halide salts of the invention, the absorbent may be present in the absorber at temperatures higher than those permissible when using conventional absorption refrigeration compositions, while still producing the same cooling temperature in the evaporator. This in turn permits cooling of the absorber by rejection of heat to a heat sink at a temperature higher than that found feasible in the prior art.

For example, systems employing aqueous solutions of lithium bromide as an absorption refrigeration composition are limited to operation employing cool water (i.e. at a temperature of less than about 90° F.) as the cooling medium in the absorber. This requires that the systems be operated with a natural supply of cool water, such as from a river or well, or that the water coolant be recycled after rejection of heat therefrom to an air sink by evaporation in a cooling tower. According to the present invention, the coolant, such as water, to which heat is rejected in the absorber of a refrigeration apparatus may be at temperatures considerably above 90° F. and is also raised in the absorber to such high temperatures that direct cooling of this water by air is feasible without need for evaporative cooling and its concomitant water loss.

Accordingly, it is a principal object of the present invention to provide absorption refrigeration systems and processes adaptable to air-cooled operation.

It is another object of the invention to provide absorption refrigeration systems and processes capable of producing evaporator temperatures of 32° F. or less.

It is another object of the invention to provide absorption refrigeration systems and processes employing elevated generator temperatures which can be attained by heating with steam at pressures of 125 p.s.i.g. or greater.

It is a further object of the present invention to provide stable, non-toxic absorption refrigeration compositions adaptable to a high degree of concentration to give absorbent solutions of exceptionally low vapor pressure, while retaining properties such as viscosity and rate of water absorption comparable with aqueous absorption refrigeration compositions now employed in the art.

It is also an object of the present invention to provide aqueous coolant compositions of high boiling point and low vapor pressure.

It is another object of the invention to provide absorption refrigeration and coolant compositions comprising an aqueous solution of lithium chloride or lithium bromide and zinc chloride or zinc bromide, with the optional presence of additional calcium chloride or calcium bromide, in the proportions hereinafter described and claimed.

It is still another object of the present invention to provide absorption refrigeration systems and processes employing the absorption refrigeration compositions of the present invention.

DESCRIPTION OF THE DRAWINGS

Other objects and advantages of the present invention will be better understood by reference to the further accompanying drawings in which.

DETAILED DESCRIPTION OF THE INVENTION

Figure 1:
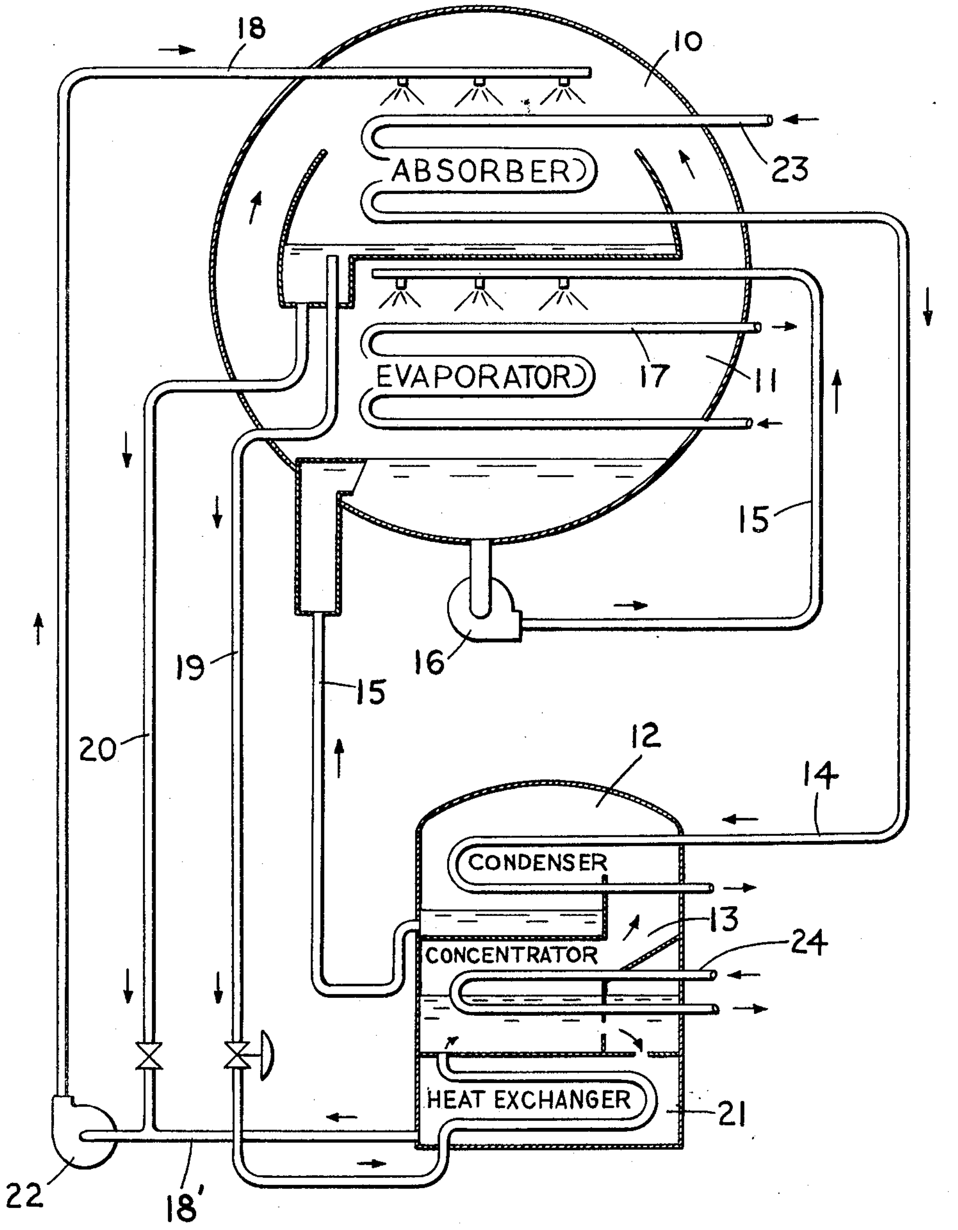
FIGURE 1 of the accompanying drawing is a schematic diagram of a typical absorption refrigeration apparatus.
Figure 2:
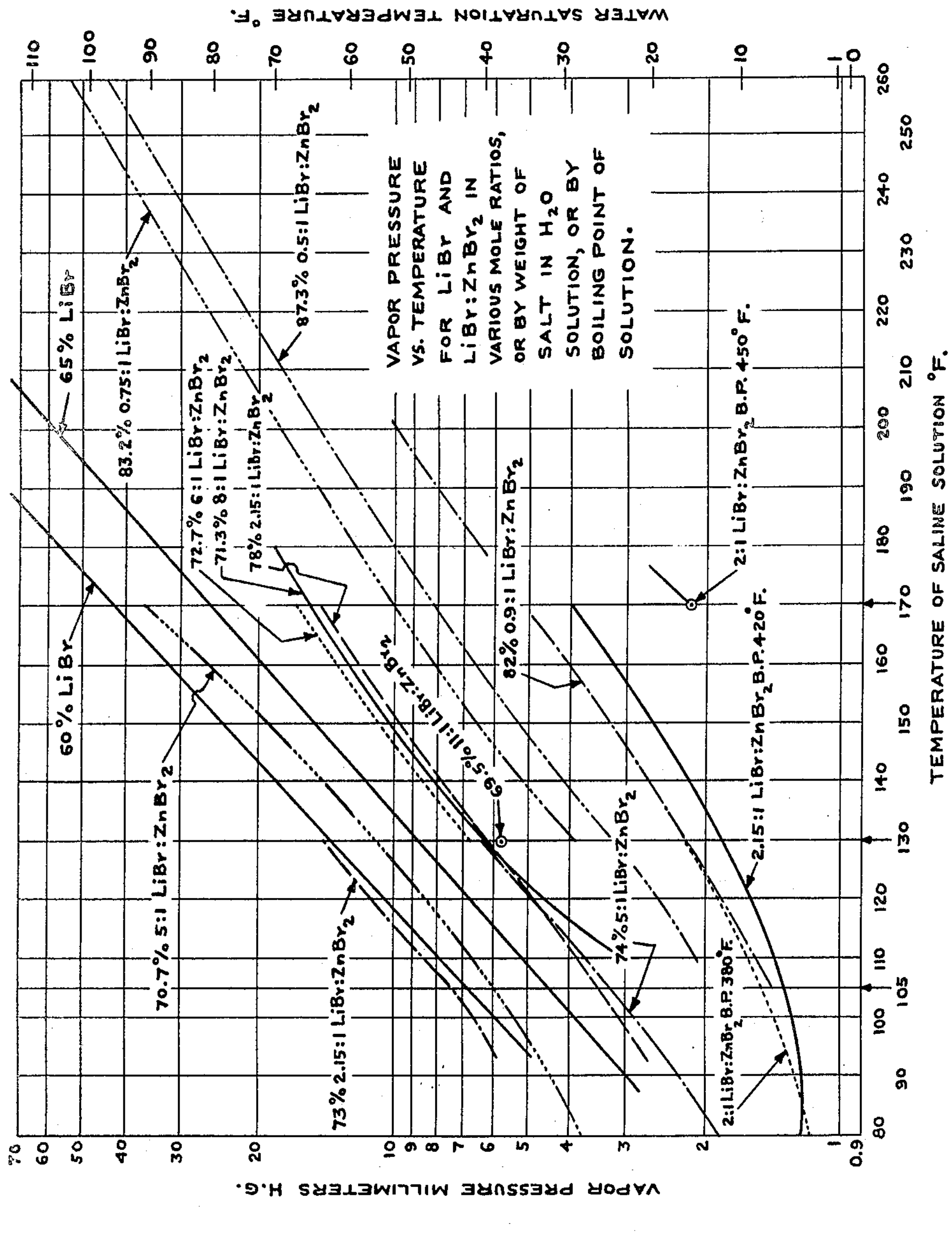
FIG. 2 is a plot of vapor pressure vs. temperature for aqueous solutions of lithium bromide, or of lithium bromide and zinc bromide in a 1:1 molar ratio, at various concentrations.
Figure 3:
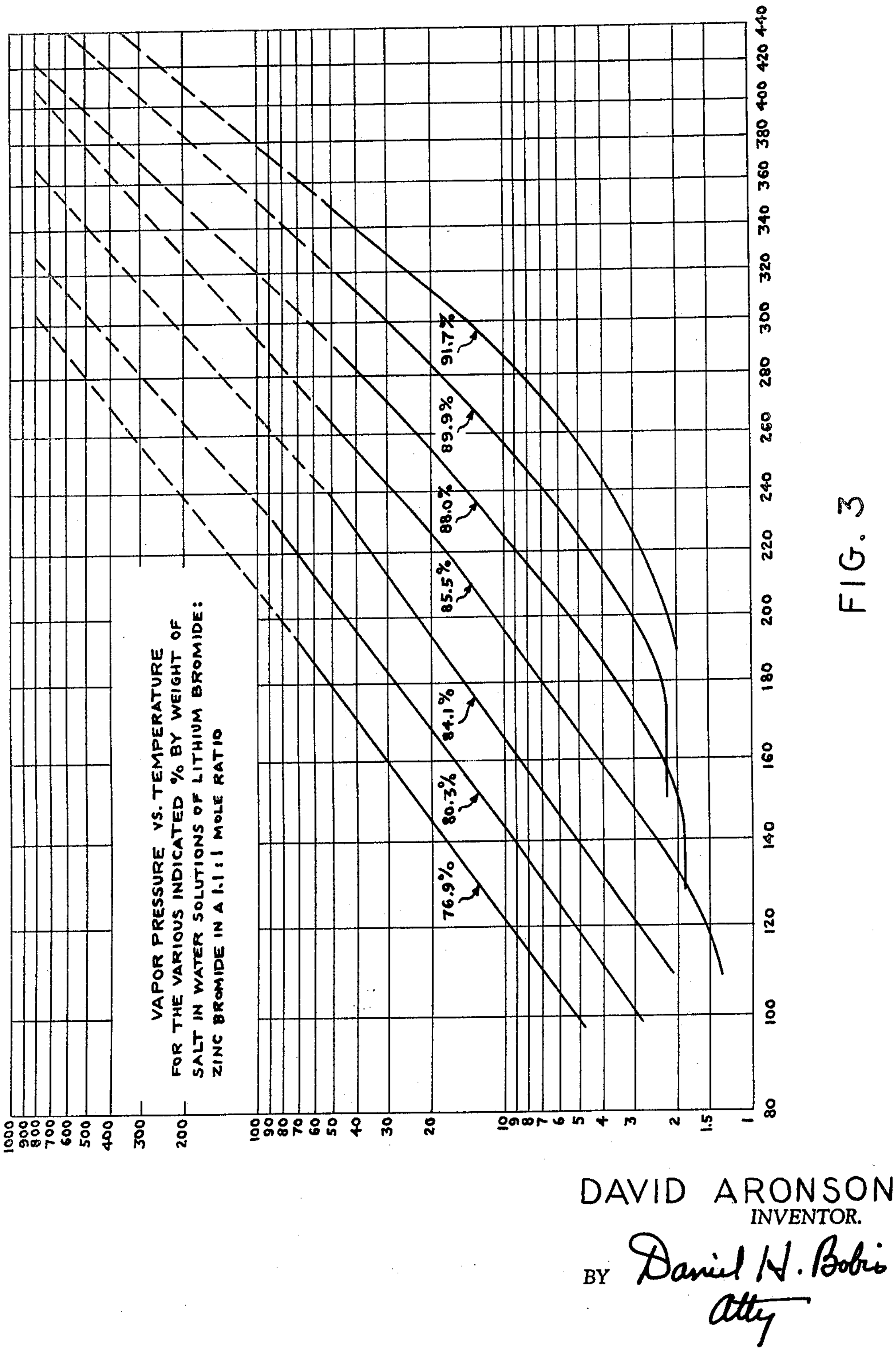
FIG. 3 is a plot of vapor pressure vs. temperature for aqueous solutions of lithium bromide, or of lithium bromide and zinc bromide in various molar ratios, at various concentrations.
Figure 4:
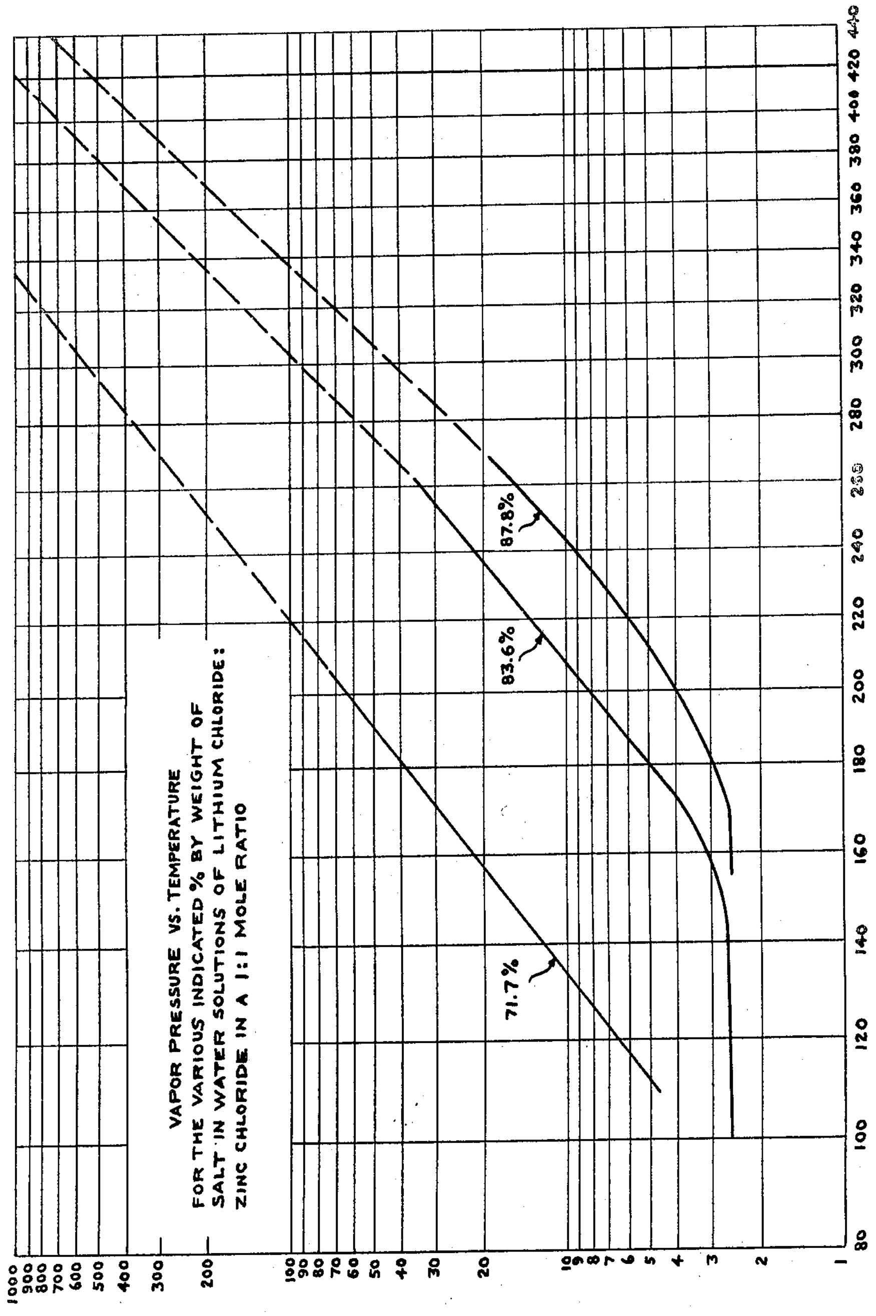
FIG. 4 is a plot of vapor pressure vs. temperature for aqueous solutions of lithium bromide and zinc bromide in a 1.1:1 molar ratio at a series of concentrations.
Figure 5:
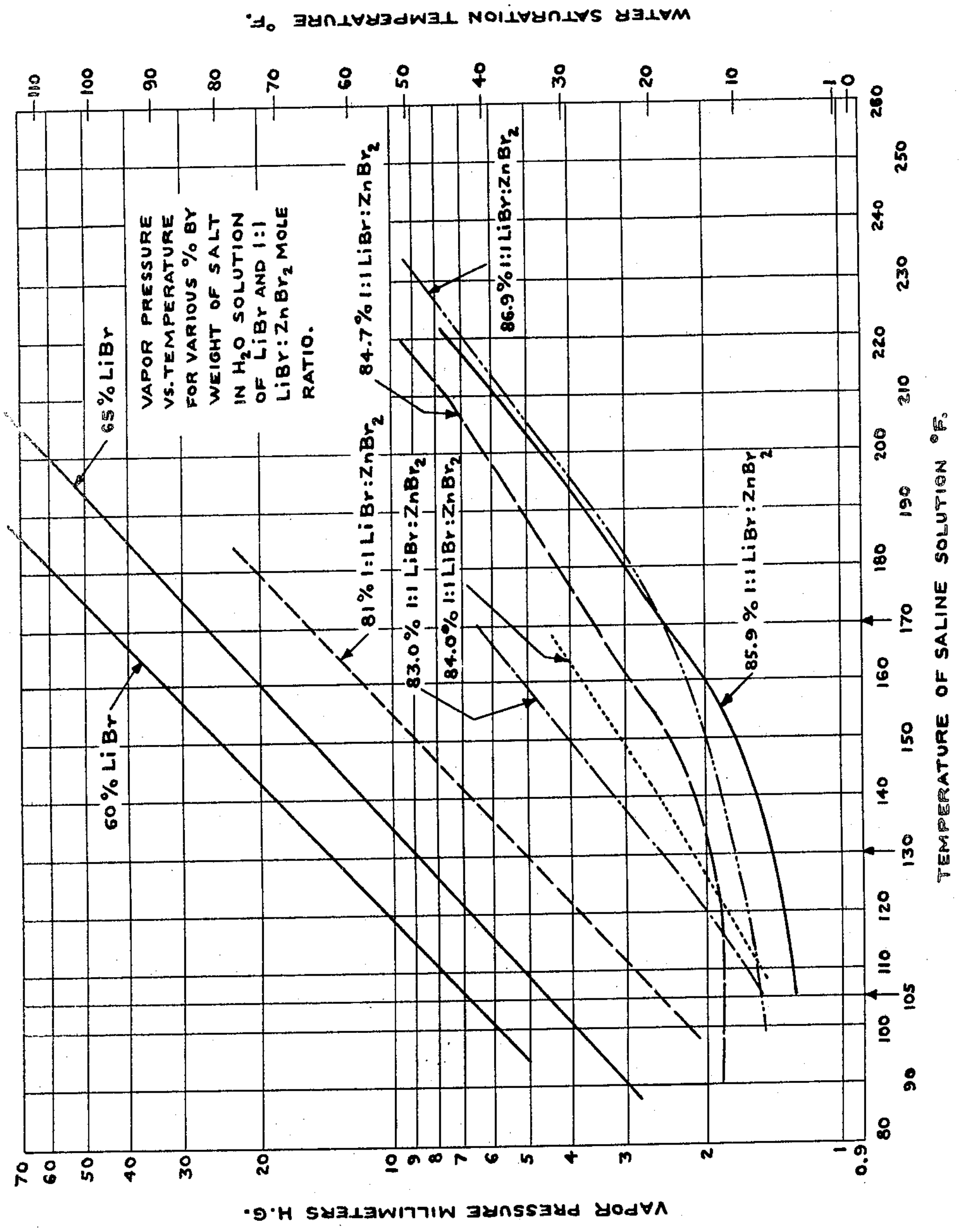
FIG. 5 is a plot of vapor pressure vs. temperature for aqueous solutions of lithium chloride and zinc chloride in a 1:1 molar ratio at a series of concentrations.

Using the mixed halide systems of the present invention, aqueous absorber solutions can be prepared at much higher salt concentrations (and having lower water vapor partial pressures) than is possible with a lithium halide, such as lithium bromide, alone. However, if the mixed salt solutions are compared with lithium bromide solutions in the more dilute range in which lithium bromide solutions are possible, the mixed salt solutions seem thermodynamically inferior.

Thermodynamically speaking, in any concentrated non-ideal solution, the ratio of the activity of the solvent to its mol fraction in the solution differs from unity by an amount equal to the fractional extent to which the solvent vapor pressure of the solution deviates from Raoult's Law. This ratio, which is commonly called the activity coefficient of the solvent, is thus, the factor by which the solvent mol fraction in the solution must be multiplied in order to obtain the activity (or effective mol fraction) of the solvent in the solution. Heretofore in the refrigeration art, the goal has been to employ as absorption refrigeration compositions those solutions (having properties otherwise compatible for use in absorption refrigeration apparatus) in which the activity coefficient is minimized, i.e. shows the greatest negative deviation from unity. In such solutions, the effective mol fraction of the solvent in the solution, and hence the equilibrium vapor pressure of the solvent, would be the lowest.

However, the addition of zinc bromide to a solution of lithium bromide results in an increase in the activity coefficient of the solvent, as will be evident from a consideration of the following table in which the activity coefficient of water, $\alpha_2$, has been determined by vapor pressure measurements at a temperature, T, of 170° F., an aqueous $LiBr:ZnBr_2$ solutions having a constant salt mol fraction, $X_1$, of 0.3, but in which the molar ratio of the salt components varies.

Table ($X_1=0.3$; T=170° F.)

| $LiBr:ZnBr_2$ mol ratio: | Activity coefficient, $\alpha_2$ |
|---|---|
| LiBr (pure) | 0.080 |
| 2:1 | 0.11 |
| 1:1 | 0.15 |

Superficially, then, it would appear to one skilled in the art that the compositions of the present invention would be less suitable for use in absorption refrigeration systems than compositions already known in the art. It could not be foreseen by one skilled in the art that the mixed halide systems of the present invention can, however, form solutions of such high concentration before reaching saturation at lower vapor pressures than those attainable over "less ideal" solutions of lower saturation concentration can be achieved.

These advantageous properties of aqueous solutions of mixed lithium and zinc halides similarly could not be foreseen from contemplation of the properties exhibited by alcohol solutions of the salts, known in the art for nearly 25 years [cf. Hainsworth, "Refrigerants and Absorbents," Part I, Refrig. Eng. 48, 97–100 (1944); Part II, ibid. 48, 201–05 (1944) and the more recent review of this work by Aker, Squires, and Albright in the ASHRAE Journal, 90–91 (May 1965) and the ASHRAE Transactions 71, Part I, 14–20 (1965)]. The alcohol solutions, of course, are open to the fundamental objections of flammability and toxicity. They further have vapor pressure temperature relationships so significantly different from those of aqueous systems that they cannot be used in the apparatus now commonly and conventionally employed for such systems.

FIGS. 2, 3, 4, and 5 are vapor pressure curves for typical refrigeration compositions according to the present invention.

Figure 6:
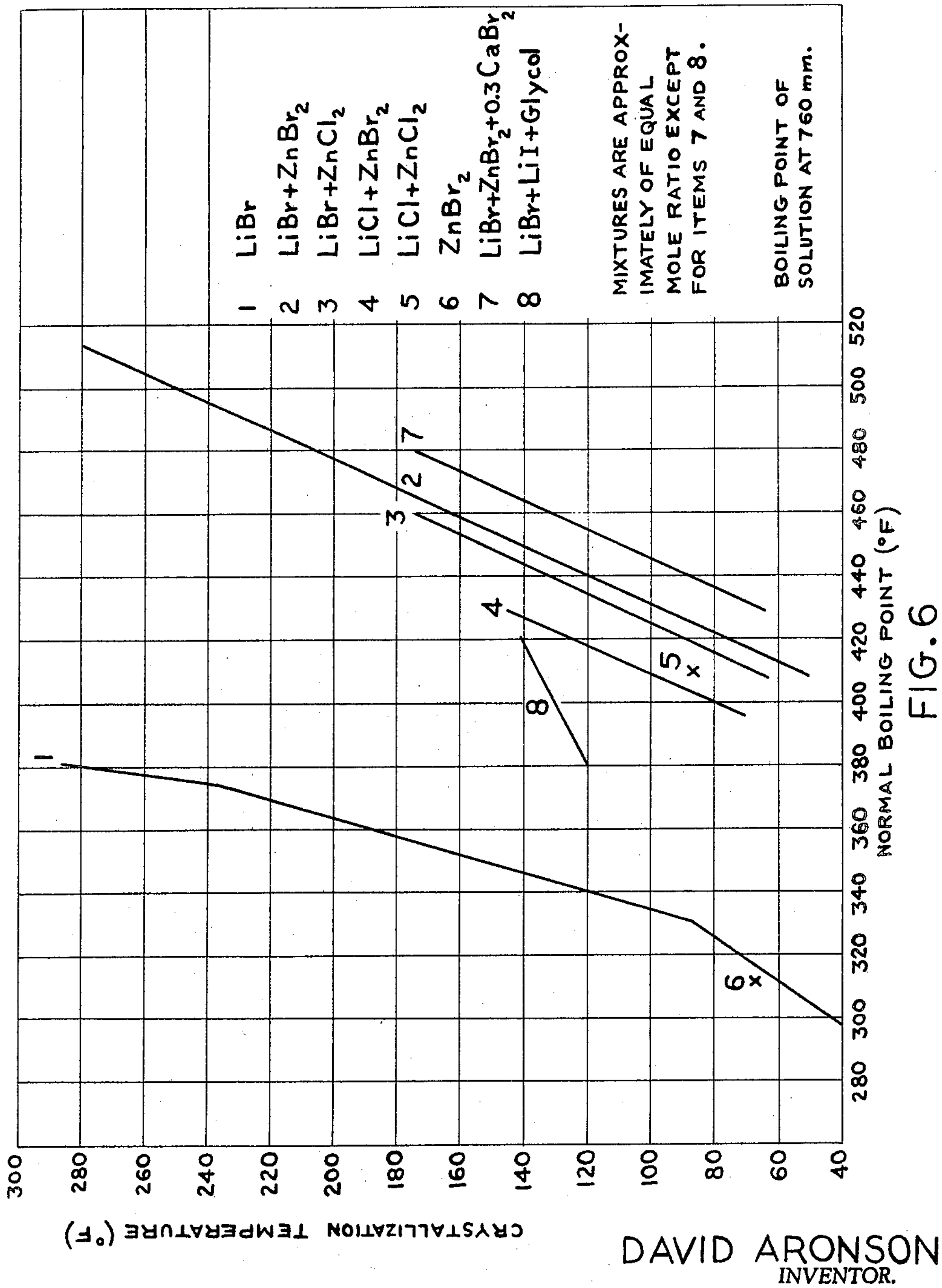
FIG. 6 is a plot of crystallization temperature vs. normal boiling point for an aqueous solution of lithium bromide and one of zinc bromide, for approximately equimolar aqueous solutions of lithium bromide or lithium chloride together with zinc bromide or zinc chloride, for an equimolar aqueous solution of lithium bromide and zinc bromide with a minor addition of calcium bromide, and for a typical prior art composition comprising lithium bromide and lithium iodide in glycol.
Figure 7:
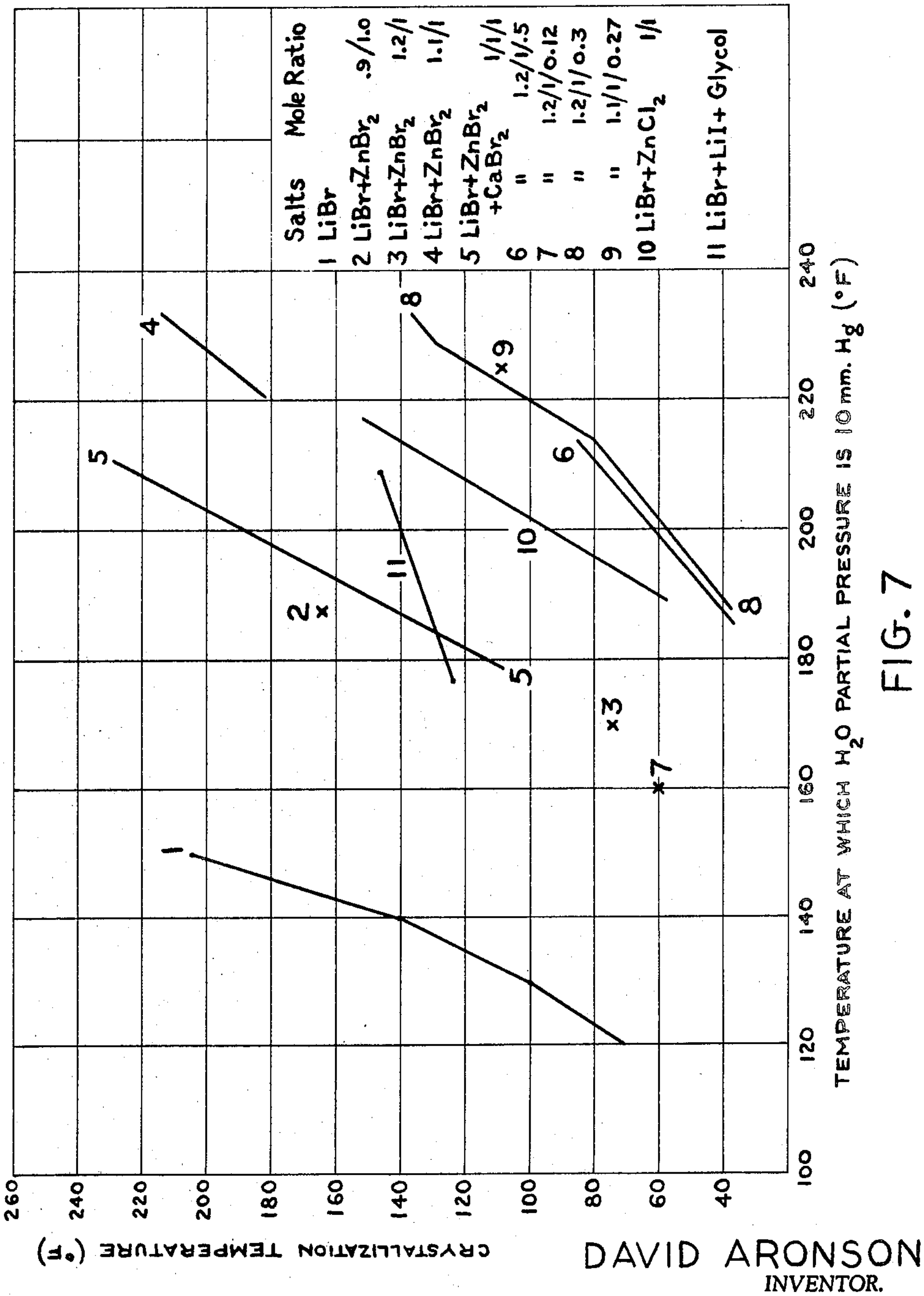
FIG. 7 is a plot of crystallization temperature for several single and mixed halide salts at various mol ratios plotted against that temperature of an aqueous solution of the corresponding mixed or single halide salts which would produce a water vapor partial pressure of 10 mm. Hg over the solution, i.e. the vapor pressure of pure water at a temperature of 50° F., including a comparison curve for lithium bromide and lithium iodide in glycol.

FIGS. 6 and 7 show the approximate crystallization temperature (i.e. the temperature at which solid solute is present in a solution of the solute at a given concentration, determined by heating or cooling the solution) of solutions of lithium bromide, zinc bromide, and mixed lithium and zinc bromides and chlorides plotted vs. solution concentration expressed in terms of the solution temperature required to give a water vapor pressure of 760 mm., i.e. the normal boiling point of the solution (FIG. 6), and 10 mm. (FIG. 7) respectively. As can particularly be seen from FIG. 7, when employing solutions of a material such as lithium bromide in an absorption refrigeration system, the generation of evaporator temperatures of about 50° F. (i.e. 10 mm. pressure) requires working at temperatures (at solution concentrations) close to the crystallization temperatures of the solutions. In such systems, there is always the possibility that an accidental or inadvertent departure from optimum operating conditions will result in crystallization and plugging of the apparatus.

While the greater solubility limits of the mixed halide systems of the present invention permit operation at much higher solution temperatures and concentrations without danger of crystallization, as is evident from FIGS. 6 and 7, the systems of the invention have other advantageous properties not evident from the figures. A circulating aqueous solution of absorbent according to the present invention remains fluid at temperatures significantly below those which would result in the plugging of cooling apparatus employing a material such as aqueous lithium bromide. This is not due only to the lower crystallization temperatures for the mixed salt solutions as compared with a solution of equivalent concentration of aqueous lithium bromide, but also for unexpected kinetic and mechanical reasons. Thus, the solutions of the present invention are apparently capable of a greater degree of super-cooling than is possible in solutions of materials such as lithium bromide. As a result, the formation of crystals in the solutions of the present invention often requires a longer period of time than does crystal formation in lithium bromide solutions, even though both solutions may be below their respective crystallization temperature. Further, compositions according to the present invention containing precipitated crystals and supernatant liquid remain surprisingly fluid under conditions in which complete plugging would occur if lithium bromide alone were present. This continued fluidity is believed related to the form of the crystals which are precipitated. Thus, even though precipitation may occur in the absorbent solutions of the present invention, the crystals formed are of such a size and physical character as will permit some fluid circulation even below the crystallization temperature.

Figure 8:
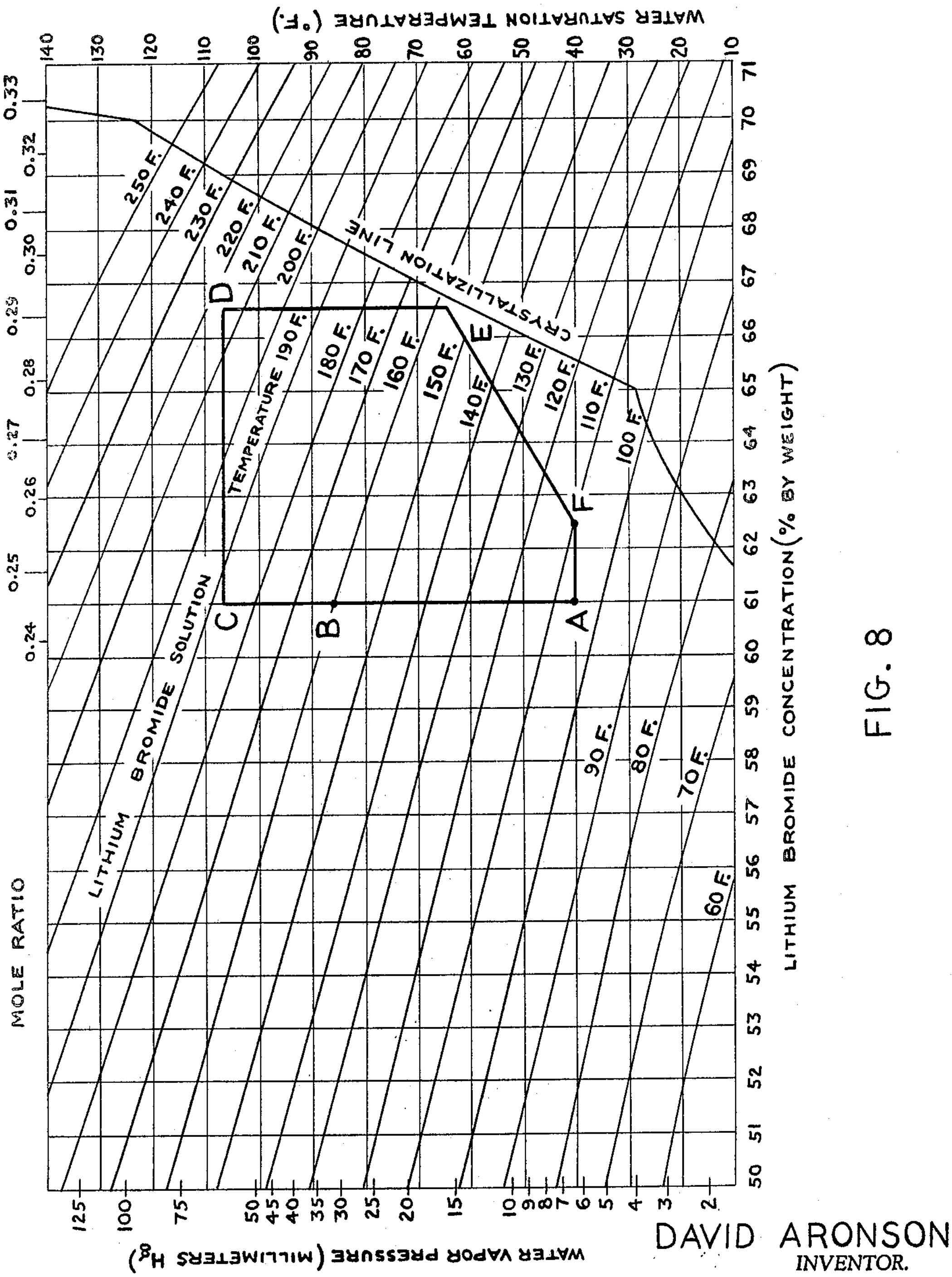
FIG. 8 is a lithium bromide equilibrium diagram correlating water vapor pressure (and the corresponding water-saturation temperature in degrees F.) with solution temperature as a function of concentration for a solution of lithium bromide, on which diagram is superimposed a closed curve indicating typical parameters encountered in a prior art absorption refrigeration cycle employing an aqueous solution of lithium bromide as the absorption refrigeration composition.

Typical parameters for a refrigeration cycle employing lithium bromide as the refrigerating composition are evident from inspection of the closed curve on the lithium bromide equilibrium diagram shown in FIG. 8. Point A of the curve represents the temperature, pressure, and concentration prevalent in a relatively dilute absorption refrigeration composition in an absorber like that shown at 10 in FIG. 1 at a temperature of about 105° F. Heating of the composition is effected in two stages: first, by heat exchange with more concentrated solution coming from the concentrator (as represented by line AB) and second, by heating from outside sources (line BC). The temperature of the composition is raised to about 185° F. in passing to the concentrator (line AC). Within the concentrator, the solution is heated, for example with low pressure steam at about 12 p.s.i.g., with concentration of the solution from about 61 percent by weight to about 66.5 percent by removal of refrigerant (water) and with an increase in its boiling point to about 215° F. at the pressure of 60 mm. maintained (line CD). By heat exchange with dilute solution entering the concentrator, the concentrated solution leaving the contractor is next cooled to about 155° F. (line DE). Line EF shows the decrease in concentration resulting from admixing absorbent returned to the concentrator with that returned directly to absorber 10 (cf. 19 and 20 in FIG. 1), and line FA represents the further dilution of the absorbent in the absorber 10 with refrigerant vapor from the evaporator, and shows the decrease in temperature effected by cooling of the absorber with a coolant fluid. It should be noted that during this cycle, the absorbent leaving the heat exchanger (point E) is extremely close to the crystallization line shown in FIG. 8. It is not feasible to employ lithium bromide solutions in absorption refrigeration apparatus to produce a temperature of 40° F. in the evaporator unless the prevalent absorber temperature is about 110° F. or lower, which requires cooling the absorber with a heat sink, such as cool water, at a temperature of about 90° F. or below. It is evident from FIG. 8 that a cooling temperature of 40° F. with an absorber temperature of about 130° F. or more cannot be attained without exceeding the crystallization limits of lithium bromide solutions.

Figure 9:
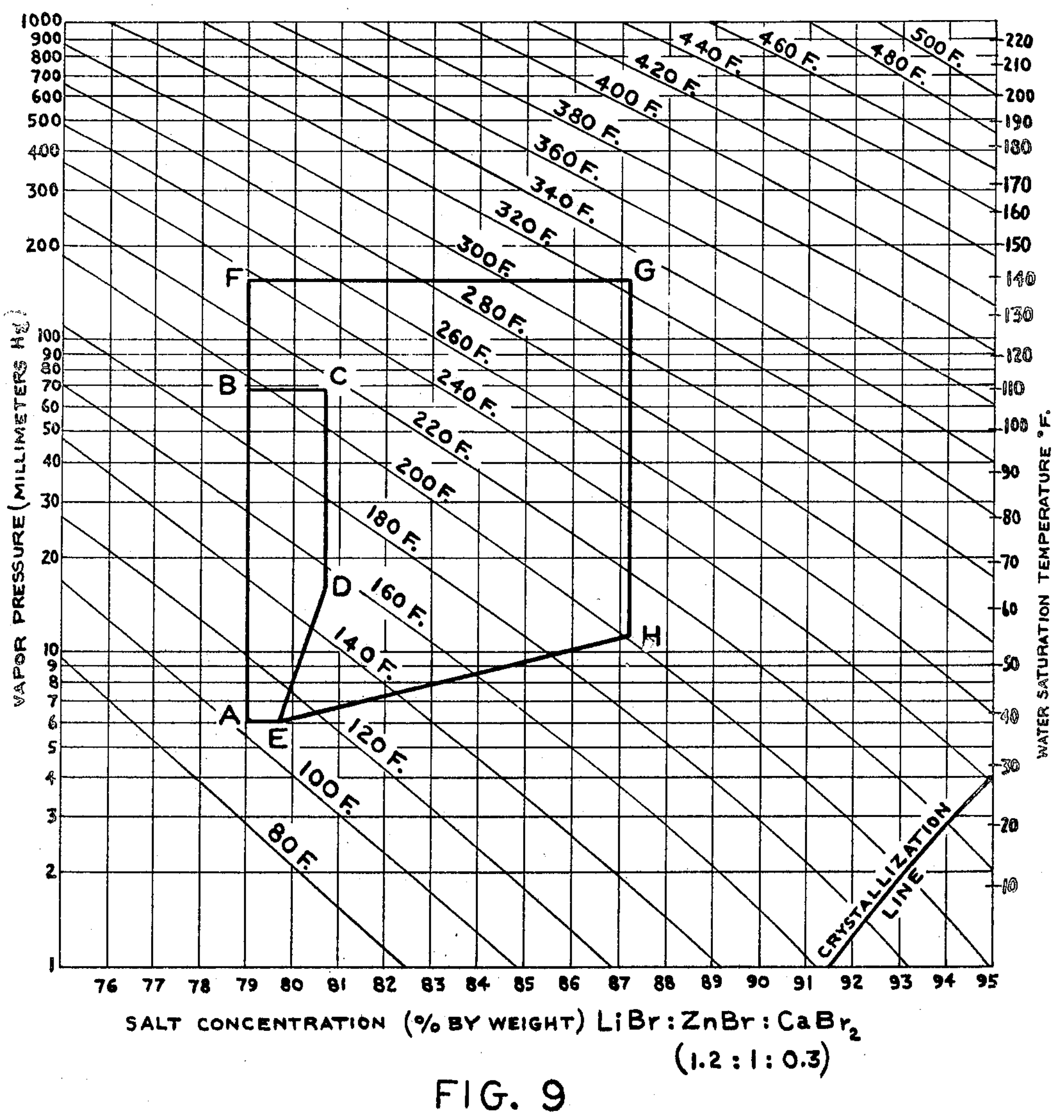
FIG. 9 is an equilibrium diagram correlating water vapor pressure (and the corresponding water-saturation temperature in degrees F.) with solution temperature as a function of concentration for a particularly preferred absorber solution containing lithium bromide, zinc bromide, and calcium bromide in a mol ratio of 1.2:1.0:0.3, on which diagram are superimposed a first closed curve ABCDE indicating typical parameters for an absorption refrigeration cycle according to the present invention using such a solution and employing low pressure steam as a heat source for the concentrator in said system, and a second closed curve AFGHE showing typical parameters for an absorption refrigeration system according to the present invention employing the same solution but having a high pressure steam source as the heat source in the concentrator.

FIG. 9 of the drawings shows operating parameters for a system employing one of the novel compositions of the present invention in an absorption refrigeration apparatus like that shown in FIG. 1, and compares the effects of using low pressure steam and high pressure steam in the concentrator of the apparatus while maintaining an evaporator temperature of about 40° F. and an absorber temperature of about 105° F. In curve ABCDE of FIG. 9, line BC represents concentration of the solution in a concentrator such as 13 of FIG. 1. In the concentrator, the solution is heated with low pressure steam (e.g. at about 12 p.s.i.g.) to a maximum practical temperature of about 215° F. attainable with this heat source. This results in a change of only about 1.5 percent in the concentration of the absorbent solution.

In contrast, when high-pressure steam (e.g. at about 125 p.s.i.g.) is employed, the solution can be heated to a the concentrated absorbent differs in concentration from temperature as high as 320° F. in the concentrator (line FG). In the operation employing high-pressure steam, the concentrated absorbent differs in concentration from the diluted absorbent by as much as 8 percent by weight.

Because the change in vapor pressure per unit change in concentration is greater for the solution of the present invention than for conventional compositions such as lithium bromide, the changes in vapor pressure producing cooling in refrigeration apparatus employing the new solutions are accompanied by relatively small changes in absorbent concentration, as is particularly evident in cycle ABCDE of FIG. 9. Also, because the quantity of solution respectively circulated in refrigeration cycles ABCDE and AFGHE of FIG. 9 is inversely proportional to the areas enclosed by these curves, it is evident that with relatively large amounts of solution needed to be circulated when low-pressure steam is used in a concentrator, the heat economy of the system is poor. This results from greater end temperature losses in heat exchange operations and the larger number of cycles required to achieve a given cooling effect.

Because the solutions of the present invention can be highly concentrated without crystallization, i.e. can be brought to high temperatures, they can be used in apparatus employing concentrator temperatures which are not possible using other compositions. Because high pressure steam can be used as a heat source, eliminating the need for apparatus reducing the steam from pressures at which it is usually distributed, significant apparatus simplification and cost reduction is possible. As mentioned earlier, the use of high-temperature steam as a heating source in the concentrator also makes air-cooling of the absorber feasible.

Figure 10:
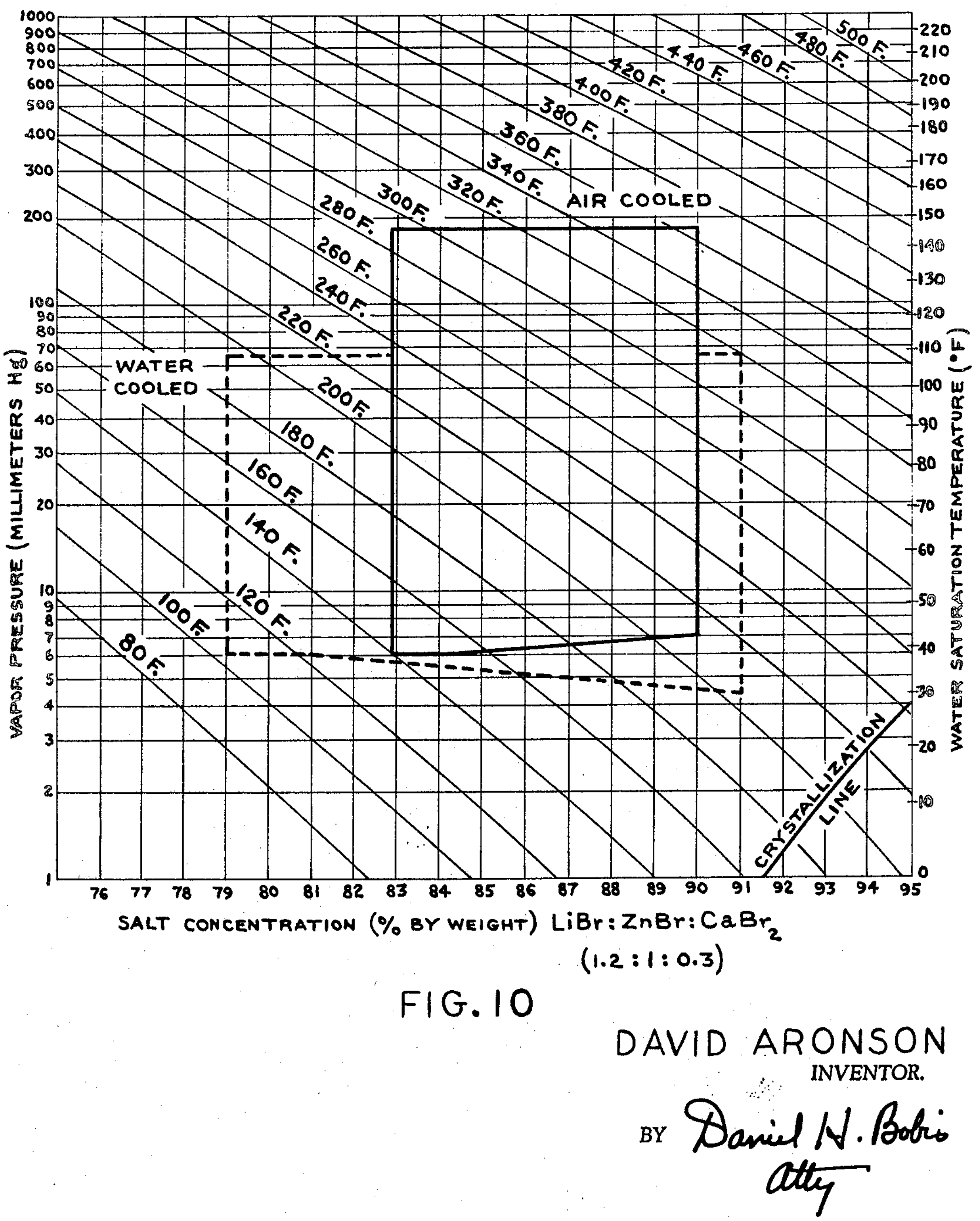
FIG. 10 is an equilibrium diagram for the same mixed halide solution as that of FIG. 9 having superimposed thereon a first closed curve showing typical parameters encountered in employing the solution as an absorption refrigeration composition in apparatus having a high temperature heat source for the concentrator and employing water cooling in the absorber, and a second closed curve representing typical parameters encountered in the operation of the same absorption refrigeration system having a high temperature heat source in the concentrator but employing air cooling.

Typical parameters for water-cooled and air-cooled absorption refrigeration systems employing the absorption refrigeration composition of the present invention and high concentrator temperatures are compared in FIG. 10, which is an equilibrium diagram like that of FIG. 9 having closed curves describing simplified refrigeration cycles plotted thereon. In the water-cooled system (broken line) the system operates between an absorber temperature of about 100° F. and a concentrator temperature of about 320° F. In the air-cooled system, a concentrator temperature of about 370° F. is reached. An absorber temperature of 140° F. is produced by air-cooling. In both cases, a vapor pressure corresponding with a water saturation temperature of 40° F. is maintained in the evaporator.

Figure 11:
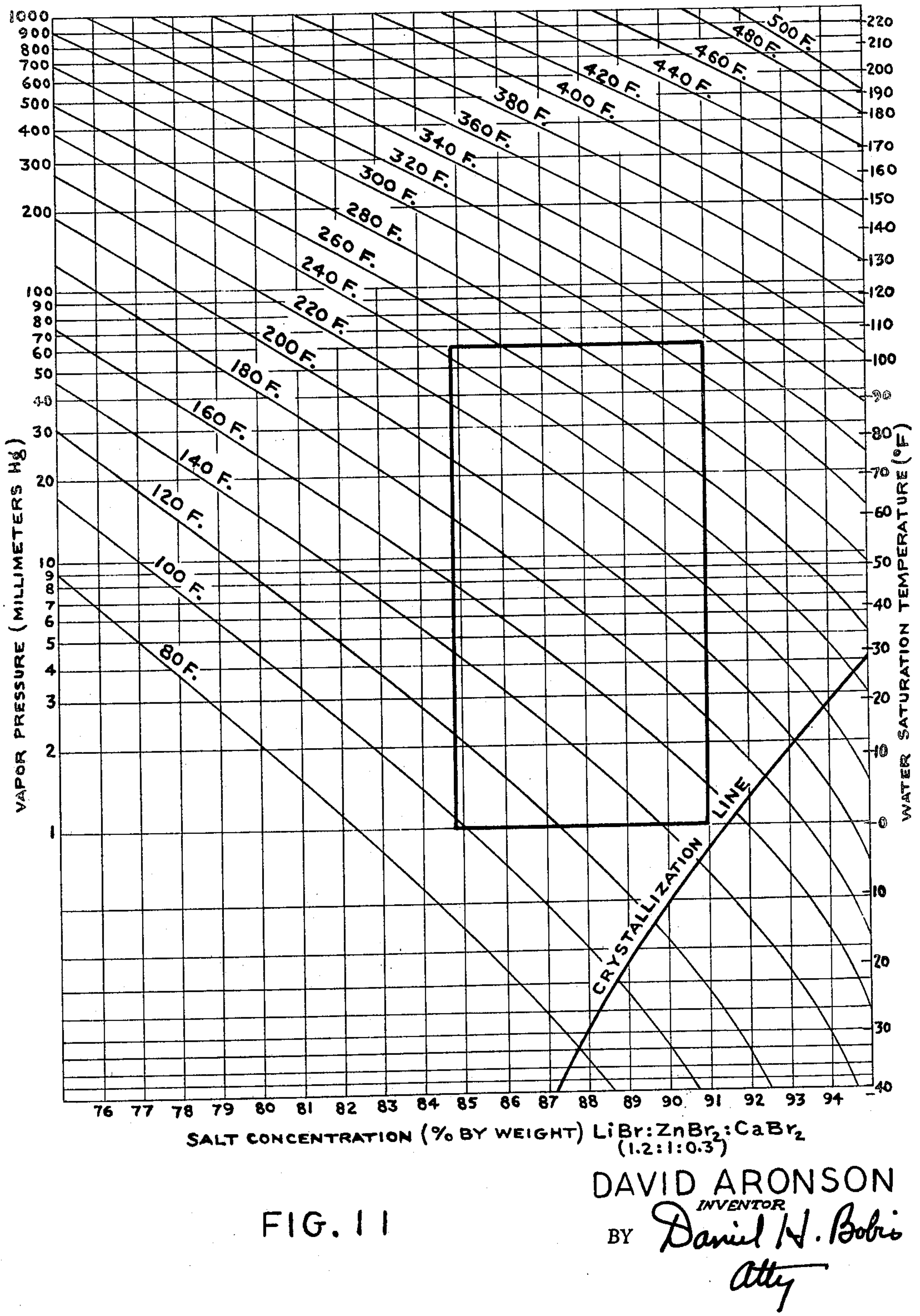
FIG. 11 is an equilibrium diagram for the same mixed halide solution as that of FIGS. 9 and 10 having superimposed thereon a closed curve showing typical parameters encountered in producing a refrigeration temperature of about 0° F.

FIG. 11 is a simplified equilibrium diagram like that of FIG. 10 on which is plotted a curve descriptive of the typical operation of a refrigeration system employing a composition of the present invention to produce an evaporator temperature of about 0° F. A temperature of about 100° F. is maintained in the absorber by water-cooling. A temperature of about 315° F. is used in the concentrator. On leaving the concentrator, the solution remains above the crystallization temperature. A system of this sort permits the rapid production of low temperatures and is useful for quick-freezing substances such as foods.

In absorption refrigeration systems of commercial interest, the novel aqueous salt solutions of the invention are preferably used at salt concentrations producing an elevation in the normal boiling point of at least 60° F. The concentration by weight of salt required to give this minimum elevation will vary with the specific salt mixtures employed. Maximum salt concentrations are determined only by the crystallization limits of the solutions at the operating temperatures prevailing in the concentrator and absorber of the specific refrigeration system in which they are employed. In general, the salt concentrations vary between 55 percent by weight and 95 percent by weight. For solutions of lithium and zinc chlorides, salt concentrations between 70 percent and 90 percent would be preferred for use in commercial refrigeration systems: for solutions of lithium and zinc bromides, a range of 75 percent to 95 percent would be preferred. However, solutions high in LiBr, such as those in which the mol ratio of LiBr to $ZnBr_2$ is 11:1, for instance, could be used as concentrations of 55 percent to 75 percent.

At still lower concentrations, from 30 percent up to 80 percent, the solutions are of utility as coolants, e.g. for the engines of motor vehicles or other machinery employing water cooling. Because of their low vapor pressure even at elevated temperatures, the coolants can be employed in sealed systems (suitably having an expansion tank or other expandable member) excluding atmospheric air. This has the advantage of greatly inhibiting corrosion.

Because of their high boiling points, the coolants can be circulated at substantially atmospheric pressures at temperatures higher than those possible with other coolant fluids. The greater efficiency of heat transfer processes with larger temperature differences in turn permits heat exchange systems of smaller size.

What is claimed is:

1. An absorption refrigeration system comprising, in combination, an absorption refrigeration apparatus and, as an absorption refrigeration composition therein, an aqueous solution comprising a lithium halide and a zinc halide, each selected from the group consisting of chlorides and bromides, the molar ratio of lithium halide to zinc halide in said solution being between about 11:1 and 1:2.

2. An absorption refrigeration system as in claim 1 wherein said aqueous solution additionally comprises a calcium halide selected from the group consisting of calcium chloride and calcium bromide, the molar ratio of lithium halide to zinc halide in said solution being between about 5:1 and 1:2 and the molar ratio of lithium halide and zinc halide to calcium halide being between about 10:1 and 2:1.

3. An absorption refrigeration system as in claim 1 wherein said absorption refrigeration apparatus is air-cooled.

4. An absorption refrigeration system as in claim 1 wherein said absorption refrigeration apparatus is heated with steam at a pressure of at least 125 p.s.i.g.

5. An absorption refrigeration process which comprises driving off water vapor from an aqueous solution comprising a lithium halide and a zinc halide in a generating zone, said halides being selected from the group consisting of chlorides and bromides and the molar ratio of lithium halide to zinc halide in said solution being between about 11:1 and 1:2, whereby said solution is concentrated; condensing water vapor from said solution to liquid water in a condensing zone; evaporating said liquid water to water vapor in an evaporating zone to produce refrigeration; and, in an absorbing zone, absorbing water vapor evaporated in said evaporating zone in concentrated solution from said generating zone.

6. A refrigeration process as in claim 5 wherein said aqueous solution additionally comprises a calcium halide selected from the group consisting of calcium chloride and calcium bromide, the molar ratio of lithium halide to zinc halide in said solution being between about 5:1 and 1:2 and the molar ratio of lithium halide and zinc halide to calcium halide being between about 10:1 and 2:1.

7. A refrigeration process as in claim 5 wherein said absorbing zone is air-cooled.

8. A refrigeration process as in claim 5 wherein said generating zone is heated with steam at a pressure of at least about 125 p.s.i.g.

References Cited

UNITED STATES PATENTS

| | | | |
|---|---|---|---|
| 2,041,741 | 5/1936 | Bichowsky | 62—112 |
| 2,986,525 | 5/1961 | Hughes | 252—67 |
| 3,004,919 | 10/1961 | Rush et al. | 252—67 |

OTHER REFERENCES

W. R. Hainsworth: "Refrigerants and Absorbents," September 1944, pp. 201–205 relied on.

LLOYD L. KING, Primary Examiner

U.S. Cl. X.R.

252—67